US006304992B1

(12) United States Patent
Cypher

(10) Patent No.: US 6,304,992 B1
(45) Date of Patent: Oct. 16, 2001

(54) TECHNIQUE FOR CORRECTING SINGLE-BIT ERRORS IN CACHES WITH SUB-BLOCK PARITY BITS

(75) Inventor: Robert Cypher, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/160,214

(22) Filed: Sep. 24, 1998

(51) Int. Cl.$^7$ .................................................. H03M 13/00
(52) U.S. Cl. ........................ 714/757; 714/763; 714/768; 714/54; 711/100
(58) Field of Search ........................ 714/805, 7, 767, 714/768, 757, 758, 348, 763, 765; 370/511, 334; 348/420; 386/112; 382/251; 375/240; 341/58; 711/112, 113, 117, 118, 119, 121, 129, 221

(56) References Cited

U.S. PATENT DOCUMENTS

| Re. 30,187 | 1/1980 | Hong et al. ............................. 714/758 |
|---|---|---|
| 4,211,997 | * 7/1980 | Rudnick et al. ...................... 714/758 |
| 4,334,309 | 6/1982 | Bannon et al. ....................... 714/766 |
| 4,358,848 | 11/1982 | Patel ..................................... 714/761 |
| 4,447,902 | * 5/1984 | Wilkinson ............................ 714/755 |
| 4,491,943 | * 1/1985 | Iga et al. ............................... 370/511 |
| 4,845,664 | 7/1989 | Aichelmann, Jr. et al. ......... 711/766 |
| 4,862,462 | 8/1989 | Zulian .................................. 714/758 |
| 4,953,164 | 8/1990 | Asakura et al. ...................... 714/754 |
| 4,995,041 | 2/1991 | Hetherington et al. ............. 714/763 |
| 5,099,484 | 3/1992 | Smelser ................................ 714/761 |
| 5,245,428 | * 9/1993 | With et al. ........................... 348/420 |
| 5,291,498 | 3/1994 | Jackson et al. ...................... 714/758 |
| 5,369,650 | * 11/1994 | Kirk et al. ............................ 714/765 |

(List continued on next page.)

OTHER PUBLICATIONS

Dell, "A White Paper on the Benefits of Chipkill–Correct ECC for PC Server Main Memory," IBM Microelectronics Division, Nov. 1997, pp. 1–23.
"Parallel Parity," http://bbs–koi.uniinc.msk.ru/tech1/1994/er_cont/block.htm, 1994, 1 pg.
"Modulo–2 Arithmetic," http://bbs–koi.uniinc.msk.ru/tech1/1994/er_cont/modulo.htm, 1994, 1 pg.
"Introduction to Error Control," http://bbs–koi.uniinc.msk.ru/tech1/1994/er_cont/intro.htm, 1994, 1 pg.
Barker et al. "ASCII Table," http://www.eng2.uconn.edu/cse/Cour . . . 08W/Refernces/Ref_ASCIITable.html, Feb. 1998, 1 pg.

(List continued on next page.)

*Primary Examiner*—Emmanuel L. Moise
*Assistant Examiner*—Emeka J. Amanze
(74) *Attorney, Agent, or Firm*—Conley, Rose & Tayon, PC; B. Noel Kivlin

(57) ABSTRACT

A data block includes a plurality of sub-blocks. Each sub-block includes a sub-block check bit that may be used to detect the presence of a bit error within the sub-block. A composite sub-block is generated, which is the column-wise exclusive-or of the bits of each sub-block. In one embodiment, the composite sub-block is not stored, but rather used for computational purposes only. A plurality of composite check bits is used to detect a bit position of a bit error within the composite sub-block. If a bit error within the data block occurs, the sub-block check bits may be used to detect in which sub-block the error occurred. The composite check bits may be used to determine which bit position of the composite sub-block is erroneous. The erroneous bit position of the composite sub-block also identifies the bit position of the erroneous bit in the sub-block identified by the sub-block check bits. Accordingly, the sub-block and the bit position within the sub-block may be detected by using the sub-block check bits and the composite check bits.

40 Claims, 7 Drawing Sheets

U.S. PATENT DOCUMENTS

| | | | | |
|---|---|---|---|---|
| 5,396,239 | * | 3/1995 | McMahon et al. | 341/58 |
| 5,537,426 | | 7/1996 | Chen | 714/785 |
| 5,642,366 | | 6/1997 | Lee et al. | 714/762 |
| 5,671,239 | * | 9/1997 | Higashitani et al. | 714/805 |
| 5,734,678 | * | 3/1998 | Paneth et al. | 375/240 |
| 5,777,307 | | 7/1998 | Yamazaki | 235/454 |
| 5,784,391 | | 7/1998 | Konigsburg | 714/773 |
| 5,841,795 | * | 11/1998 | Olarig et al. | 714/768 |
| 5,922,080 | * | 7/1999 | Olarig | 714/767 |
| 5,970,207 | * | 10/1999 | De With et al. | 386/112 |
| 5,978,953 | * | 11/1999 | Olarig | 714/768 |
| 6,035,432 | * | 3/2000 | Jeddeloh | 714/763 |

OTHER PUBLICATIONS

"Parity & Computing parity," http://bbs–koi.uniinc.msk.ru/tech1/1994/er_cont/parity.htm, 1994, 2 pgs.

"Error Correction with Hamming Codes," http://bbs–koi.uniinc.msk.ru/tech1/1994/er_cont/hamming.htm, 1994, 2 pgs.

Barker et al. "Hamming Code, Background Information," http://www.eng2.uconn.edu/cse/Courses/CSE208W/Hamming/Background.html, Feb. 1998, 3 pgs.

Barker et al., "Hamming Code, Theory," http://www.eng2.uconn.edu/cse/Courses/CSE208W/Hamming/Theory.html, Mar. 1998, 2 pgs.

"NUMA: Delivering the Next Level of Commodity SMP Performance," http://199.245.235.23/newsletters/html/vpoint5.html, 1996, 4 pgs.

Barker et al. "General Definitions," http://www.eng2.uconn.edu/cse/Cour . . . 8W/References/Ref_Definitions.html, Feb. 1998, 3 pgs.

Barker et al. "Hamming Code, Lab Procedure," http://www.eng2.uconn.edu/cse/Courses/CSE208W/Hamming/Procedure.html, Jun. 1998, 3 pgs.

Alzahrani et al., "On–Chip TEC–QED ECC for Ultra–Large, Single–Chip Memory Systems," Proceedings of the International Conference on Computer Design: VLSI in Computers and Processors, Oct. 1994, pp. 132–137.

Fuja et al., "Linear Sum Codes for Random Access Memories," IEEE Transactions on Computers, vol. 37, No. 9, Sep. 1988, pp. 1030–1041.

Mangelsdorf et al., "A VLSI Processor for HP Precision Architecture," Hewlett–Packard Journal, vol. 38, No. 9, Sep. 1987, pp. 4–11, 17.

European Search Report, Application No. 99 30 7509, mailed Aug. 24, 2000.

Castagnoli et al., "Optimization of Cyclic Redundancy–Check Codes with 24 and 32 Parity Bits," IEEE Transactions on Communications, vol. 41, No. 6, Jun. 1993, pp. 883–892.

* cited by examiner

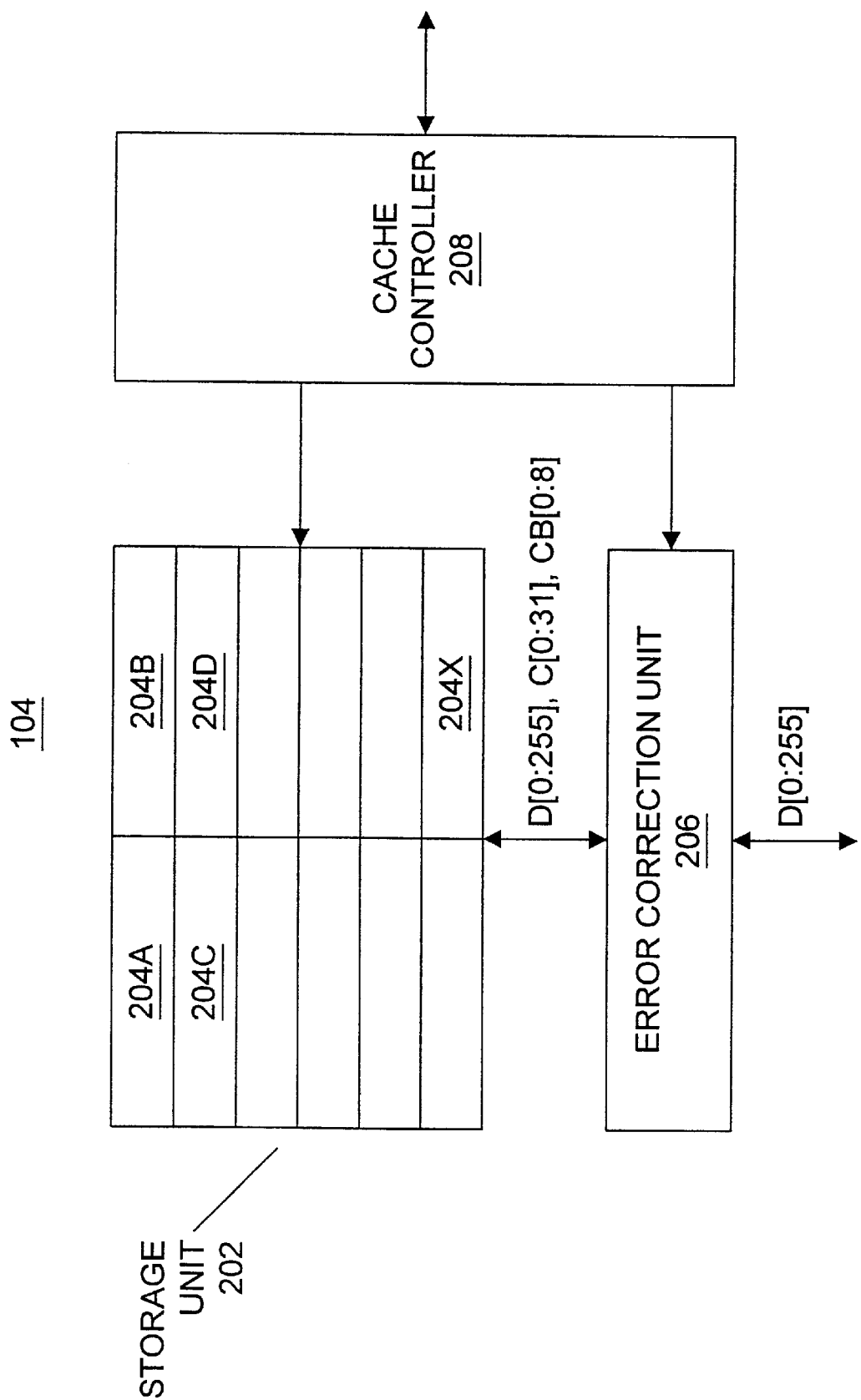

TECHNIQUE FOR CORRECTING SINGLE-BIT ERRORS IN CACHES WITH SUB-BLOCK PARITY BITS

BACKGROUND OF THE INVENTION

1. Field of the Invention

This invention relates to error correction and more particularly, to error codes that correct bit errors in computer memory systems.

2. Description of the Relevant Art

Error codes are commonly used in electronic systems to detect and/or correct data errors, such as transmission errors or storage errors. For example, error codes may be used to detect and correct errors within data transmitted via a telephone line, a radio transmitter or a compact disc laser. Another common use of error codes is to detect and correct errors within data stored in a memory of a computer system. For example, error correction bits, or check bits, may be generated for data prior to storing data to one or more memory devices. When the data are read from the memory device, the check bits may be used to detect or correct errors within the data. Errors may be introduced either due to faulty components or noise within the computer system. Faulty components may include faulty memory devices or faulty data paths between devices within the computer system, such as faulty pins.

Hamming codes are one commonly used error code. The check bits in a Hamming code are parity bits for portions of the data bits. Each check bit provides the parity for a unique subset of the data bits. If an error occurs, i.e. one or more bits change state, one or more syndrome bits will be asserted (assuming the error is within the class of errors covered by the code). Generally speaking, syndrome bits are generated by regenerating the check bits and comparing the regenerated check bits to the original check bits. If the regenerated check bits differ from the original check bits, an error has occurred and one or more syndrome bits will be asserted. Which syndrome bits are asserted may also be used to determine which data bit changes state, and enable the correction of the error. For example, if one data bit changes state, this data bit will modify one or more check bits. Because each data bit contributes to a unique group of check bits, the check bits that are modified will identify the data bit that changed state. The error may be corrected by inverting the bit identified to be erroneous.

One common use of Hamming codes is to correct single bit errors within a group of data. Generally speaking, the number of check bits must be large enough such that $2^{k-1}$ is greater than or equal to n, where k is the number of check bits and n is the number of data bits plus the number of check bits. Accordingly, seven check bits are required to implement a single error correcting Hamming code for 64 bits data block. A single error correcting Hamming code is able to detect and correct a single error. The error detection capability of the code may be increased by adding an additional check bit. The use of an additional check bit allows the Hamming code to detect double bit errors and correct single bit errors. The addition of a bit to increase the data detection capabilities of a Hamming code is referred to as an extended Hamming code.

In a single error correction code, such as a Hamming code, multiple bit errors may cause one or more syndromes to be non-zero. However, multiple bit errors may erroneously appear as a single bit error in a different bit position. For example, in a single error correcting Hamming code with six check bits, one bit error may cause two check bits to change states. Another bit error may cause two other check bits to change state. Accordingly, if these two errors occur, four check bits will change state. Unfortunately, a one-bit error in still another bit position may cause those same four check bits to change state. The error correction procedure may assume the bit that affects all four check bits changed state and invert the data bit. If the check bit changes were actually caused by two bit errors, the error correction procedure has inverted a non-erroneous bit. Accordingly, the error correction procedure has created more errors, and may erroneously indicate that the data is error free.

The addition of an extended parity bit resolves this problem. When the data are read from memory, the check bits and extended parity bit are regenerated and compared to the original check bits and extended parity bit. If the regenerated check bits are different than the original check bits, the extended parity bit may be used to determine whether one or two bit errors occurred. If one error occurs, the regenerated extended parity bit will differ from the original extended parity bit. If two errors occur, the regenerated extended parity bit will be the same as the original extended parity bit. If one or more check bits change state and the regenerated extended parity bit is different, a single bit error has occurred and is corrected. Alternatively, if one or more check bits change state and the extended parity bit is the same, two bit errors are detected and no correction is performed. In the latter case, an uncorrectable error may be reported to a memory controller or other component within the computer system. It is noted, that more than two bit errors in a logical group is not within the class of errors addressed by the error correcting code. Accordingly, three or more errors may go undetected or the error correcting code may interpret the errors as a single bit error and invert a data bit that was not erroneous.

Parity checking is a commonly used technique for error detection. A parity bit, or check bit, is added to a group of data bits. The check bit may be asserted depending on the number of asserted data bits within the group of data bits. If even parity is used, the parity bit will make the total number of asserted bits, including the data bits and check bit, equal to an even number. If odd parity if used, the parity bit will make the total number of asserted bits, including the data bits and check bit, an odd number. Parity checking is effective for detecting an odd number of errors. If an even number of errors occurs, however, parity checking will not detect the error.

One common use of error codes is to detect and correct bit errors of data stored in a cache of a computer memory system. Generally speaking, a cache is a buffer between a processor and relatively slow memory devices. The cache is typically smaller and faster than main memory, and stores data recently accessed by the processor. Because of the repetitive nature of computer programs, the processor is more likely to access recently accessed information than other information in the memory. Accordingly, by storing recently used data in the faster cache, the average access time of data may be reduced. Reducing the access time of data reduces the time in which the processor is waiting for data from memory, which increases the overall speed of the processor.

Turning now to FIG. 1, portions of a computer system that implements a cache is shown. Computer system 100 includes processor 102, cache 104, memory controller 106, and system memory 108. Other portions of computer system 100 are eliminated for simplicity. Processor 102 is coupled to cache 104. Cache 104 is coupled to memory controller 106, which is in turn coupled to system memory 108. It is noted that the computer system of FIG. 1 is for illustrative purposes only. Other configurations of a processor, cache and system memory are contemplated.

Processor 102 requests data from system memory 108 by initiating a memory read request on processor bus 110. Cache 104 receives the memory read request and determines whether the requested data are stored in cache. If the requested data are stored in cache, cache 104 supplies the data to processor 102. Alternatively, if the requested data are not stored in cache, cache 104 initiates a memory read request to memory controller 106 to read the data. In one embodiment, memory controller 106 accesses the data from system memory 108 and stores the data to cache 104, which in turn supplies the data to processor 102. Alternatively, the data from memory controller 106 may be conveyed to processor 102 in parallel with storing the data to cache 104. When processor 102 writes to data stored in cache 104, several techniques for maintaining coherency may be implemented. For example, the data may be written to both cache 104 and memory 108, or the data may be invalidated in cache 104 and written to memory 108 only. The above described operation of computer system 100 is for illustrative purposes only and is not intended to limit the scope of the claims.

It is a common design goal of computer systems to reduce the number of check bits used to detect and correct errors. The check bits increase the amount of data handled by the system, which may increase the number of memory components, data paths and other circuitry. Further, the increased number of bits increases the probability of an error. Although the check bits may make an error detectable and/or correctable, increasing the number of data bits within the system increases the probability of an error occurring. For at least these reasons, it is desirable to decrease the number of check bits for a given level of error detection and/or correction.

SUMMARY OF THE INVENTION

The present invention reduces the number of check bits required to correct errors in a data block that includes a plurality of sub-blocks. Each sub-block includes a sub-block check bit that may be used to detect the presence of a bit error within the sub-block. A composite sub-block is generated, which is the column-wise exclusive-or of the bits of each sub-block. In other words, a first bit of the composite sub-block is the exclusive-or of all the bits in a first column position of the sub-blocks. The second bit of the composite sub-block is the exclusive-or of all the bits in a second column position of the sub-blocks, etc. In one embodiment, the composite sub-block is not stored, but rather used for computational purposes only. A plurality of composite check bits is generated to detect a bit position of an error within the composite sub-block. If a bit error within the data block occurs, the sub-block check bits may be used to detect in which sub-block the error occurred. The composite check bits may be used to determine which bit position of the composite sub-block is erroneous. The erroneous bit position of the composite sub-block also identifies the bit position of the erroneous bit in the sub-block identified by the sub-block check bits. Accordingly, the sub-block and the bit position within the sub-block may be detected by using the sub-block check bits and the composite check bits.

Broadly speaking, the present invention contemplates a method of correcting a bit error in a data block comprising: partitioning the data block into a plurality of sub-blocks, wherein each sub-block includes a plurality of bit positions; generating a first sub-block check bit for a first sub-block, wherein the first sub-block check bit is configured to detect an error within the first sub-block; generating a composite sub-block, wherein each bit of the composite sub-block corresponds to a bit position in the plurality of sub-blocks; generating composite check bits for the composite sub-block, wherein the composite check bits are configured to detect and locate a bit error in the composite sub-block; detecting an erroneous bit in the first sub-block using the first sub-block check bit and determining a bit position of the erroneous bit using the composite check bits; and inverting the erroneous bit.

The present invention further contemplates a computer memory that corrects a bit error in a data block. The computer memory includes one or more storage devices and an error correction circuit coupled to the one or more storage devices. The one or more storage devices are configured to store a plurality of sub-blocks of the data block. Each of the sub-blocks includes a plurality of bit positions. The error correction circuit is configured to receive the data block, to generate sub-block check bits for each of the sub-blocks, to generate a composite sub-block, and to generate composite check bits to detect a bit position of an erroneous bit within the composite sub-block. The sub-block check bits and the composite check bits are stored in the one or more storage devices. When a data block with an erroneous bit is read from the one or more storage devices, the error correction circuit uses the sub-block check bits to determine a sub-block that includes the erroneous bit and the composite check bits to determine a bit position of the erroneous bit within the sub-block that includes the erroneous bit.

The present invention still further contemplates a cache that corrects a bit error in a data block. The cache includes one or more storage devices and an error correction circuit coupled to the one or more storage devices. The one or more storage devices are configured to store a plurality of sub-blocks of the data block. Each of the sub-blocks includes a plurality of bit positions. The error correction circuit is configured to receive the data block, to generate sub-block check bits for each of the sub-blocks, to generate a composite sub-block, and to generate composite check bits to detect a bit position of an erroneous bit within the composite sub-block. The sub-block check bits and the composite check bits are stored in the one or more storage devices. When a data block with an erroneous bit is read from the one or more storage devices, the error correction circuit uses the sub-block check bits to determine a sub-block that includes the erroneous bit and the composite check bits to determine a bit position of the erroneous bit within the sub-block that includes the erroneous bit.

BRIEF DESCRIPTION OF THE DRAWINGS

Other objects and advantages of the invention will become apparent upon reading the following detailed description and upon reference to the accompanying drawings in which:

FIG. 2 is a block diagram of a cache;

FIG. 3A illustrates a configuration of a cache entry according to one embodiment of the present invention;

FIG. 3B illustrates a configuration of a sub-block of a cache entry according to one embodiment of the present invention;

FIG. 3C illustrates a configuration of a check bit block associated with a data block stored in a cache;

Figure 1:
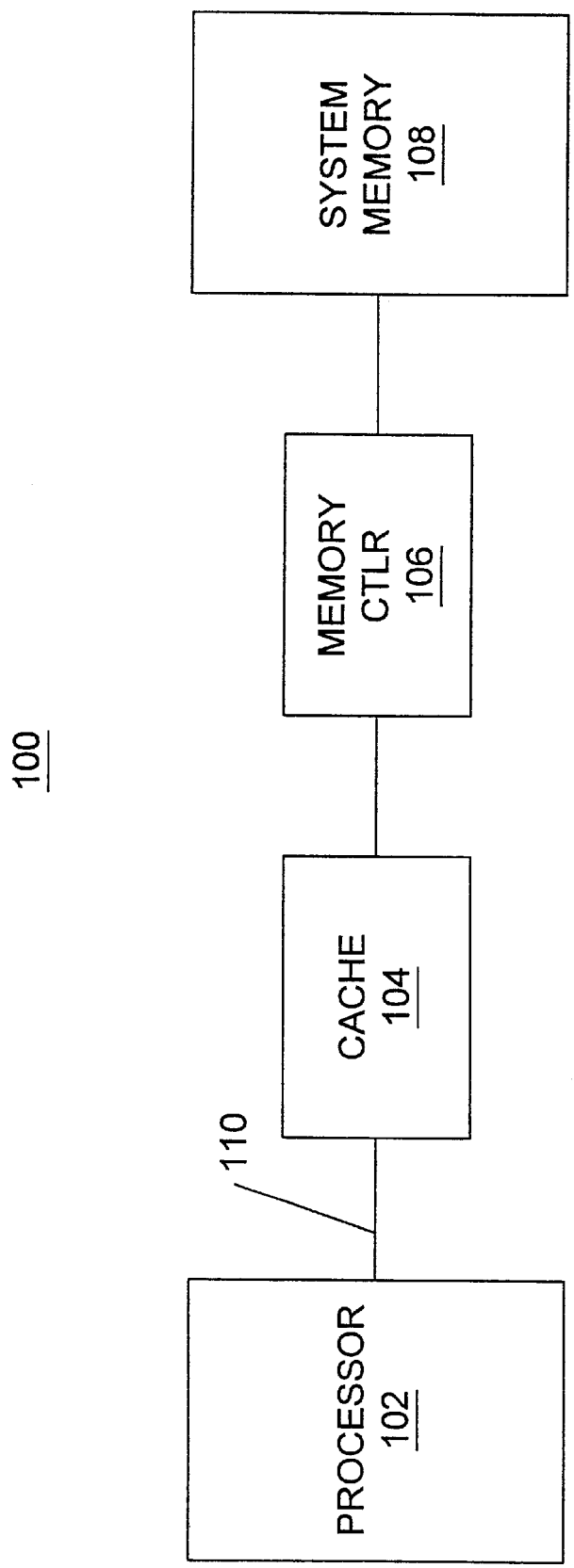
FIG. 1 is a block diagram of a processor, cache, and system memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 2, a block diagram of cache 104 according to one embodiment of the present invention is shown. In the illustrated embodiment, cache 104 includes storage unit 202, error correction unit 206 and cache controller 208. Other portions of cache 202 have been omitted for simplicity. Storage unit 202 includes a plurality of entries 204A–204X. Components designated by a reference numeral followed by a letter may be collectively referred to by the reference numeral alone. For example, cache entries 204A–204X may be referred to as cache entries 204. Generally speaking, cache controller 208 is configured to receive memory access requests from processor 102 and determine whether the requested data is present in storage unit 202. If the memory access is a read request and the requested data are stored in storage unit 202, cache controller 208 sends control signals to storage unit 202 to output the requested data. The requested data are provided to error correction unit 206, which detects and corrects one or more bit errors in the data. Alternatively, if the requested data are not present in storage unit 202, cache controller 208 is configured to send a request for the data to memory controller 106. When the data are received, the data are provided to error correction unit 206, which generates a plurality of check bits that are stored with the data in storage unit 202. If all entries are currently occupied, cache controller 208 uses one of several conventional algorithms to determine which entry the new data overwrites. For example, cache controller 208 may overwrite the least recently used entry of storage unit 202.

If the memory access is a write request and the requested data are stored in storage unit 202, several conventional techniques for maintaining coherency between cache 104 and memory 108 may be implemented. For example, the data may be written to both cache 104 and memory 108, or the data in the cache 104 may be invalidated and written to memory 108 only.

It is noted that cache 104 may be directly mapped or set associative. In one particular embodiment, storage unit 202 stores 64 byte cache lines. Each cache line includes two entries of 32 bytes each. In one particular embodiment, data may be accessed by reading or writing a 32 byte entry or by one byte writes. In one embodiment, each entry includes 32 bytes of data (or 256 bits of data) and 41 check bits. Accordingly, each entry includes 297 bits.

Turning now to FIG. 3A, a configuration of a cache entry according to one embodiment of the present invention is shown. In the illustrated embodiment, cache entry 204A includes 32 sub-blocks (S[0:31]) and one check bit block (CB). Each sub-block stores a plurality of data bits and one or more check bits that may be used to detect errors within the sub-block. The check bit block includes a plurality of check bits used to detect and correct bit errors within entry 204A.

Turning now to FIG. 3B, a configuration of a sub-block of a cache entry according to one embodiment of the present invention is shown. In the illustrated embodiment, a sub-block (S[x]) includes eight bits of data (D[x][0:7]) and one sub-block check bit (C[x]). In one particular embodiment, the sub-block check bit is a parity bit of the eight data bits. The sub-block check bit may be used to detect a bit error within the data bits. As discussed above, the sub-block check bit may be generated by error correction unit 206 prior to storing data to entry 204A.

Turning now to FIG. 3C, a configuration of a check bit block of a cache entry is shown. In the illustrated embodiment, the check bit block includes nine entry check bits. (CB[0:8]). In one particular embodiment, the nine entry check bits implement a single error correcting Hamming code for the 256 data bits and 32 check bits in the entry. Accordingly, if the sub-block check bits detect an error in the data block, the entry check bits may be used to locate and correct the erroneous bit.

In one embodiment, when a single-byte is read, the sub-block check bit corresponding to the read sub-block is checked to determine whether the sub-block includes any bit errors. If no bit errors are detected, the data of the sub-block are used. Alternatively, if a bit error is detected, then the data from each sub-block in the entry are read and the sub-block check bits are used to detect other bit errors. If multiple bit errors are detected, then an uncorrectable error is reported. If only one bit error is detected, then the entry check bits are recomputed and compared to the stored entry check bits in order to determine the bit position of the erroneous bit.

When an entry is read, the sub-block check bits of the bytes of the entry are checked. If no bit errors are detected, the data are used without correction. If multiple bit errors are detected, an uncorrectable error is reported. If one bit error is detected, the entry check bits are used to correct the bit error. In the above manner, error free data may be read from the cache without using the entry check bits to verify the accuracy of the data. When an erroneous bit is detected, however, the entry check bits may be used to correct the erroneous bit.

During a one byte write operation, all the sub-blocks of the entry are read and the check bits are checked. If no errors are detected, then the data are written to the appropriate sub-block and new entry check bits are generated and stored. Alternatively, if a single sub-block check bit is incorrect, the entry check bits are regenerated and compared to the stored entry check bits and the erroneous bit is corrected. The new data are then stored to the appropriate sub-block and new entry check bits are generated and stored. During a 32-byte write, the sub-block and entry check bits are generated, and the data and check bits are stored.

Figure 4:
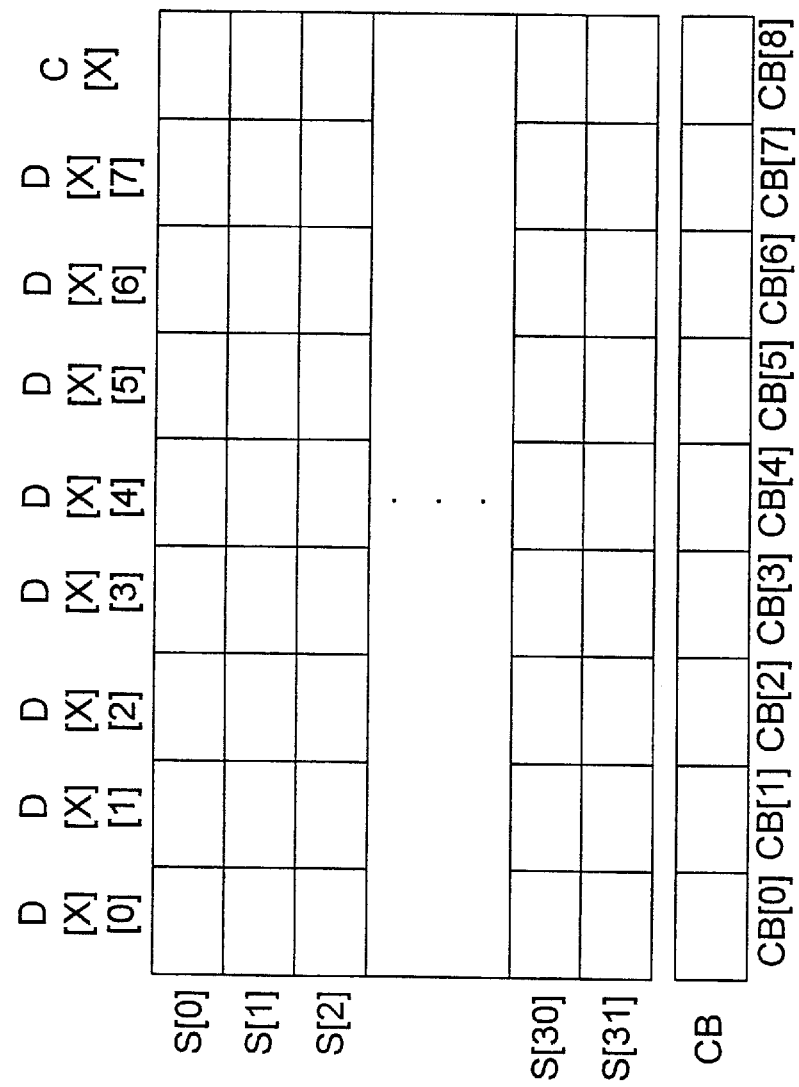
FIG. 4 illustrates the organization of a data block that includes error correction codes to correct single bit errors.

Turning now to FIG. 4, the organization of a data block that includes error correction codes to correct single bit errors is shown. In the illustrated embodiment, the data bits and check bits of entry 204A are shown. As discussed above, entry 204A includes 32 sub-blocks (S[0:31]). Each sub-block includes eight data bits (D[x][0:7]) and one sub-block check bit (C[x]). In one embodiment, the check bit of a sub-block is a parity bit of the eight data bits within the sub-block. Entry 204A additionally includes a check bit block (CB). The check bit block includes a plurality of entry check bits that may be used to detect and correct a bit error within the data bits of entry 204A. In one embodiment, the check bit block stores a nine bit Hamming code that covers the 256 data bits and 32 check bits of entry 204A.

Figure 5:
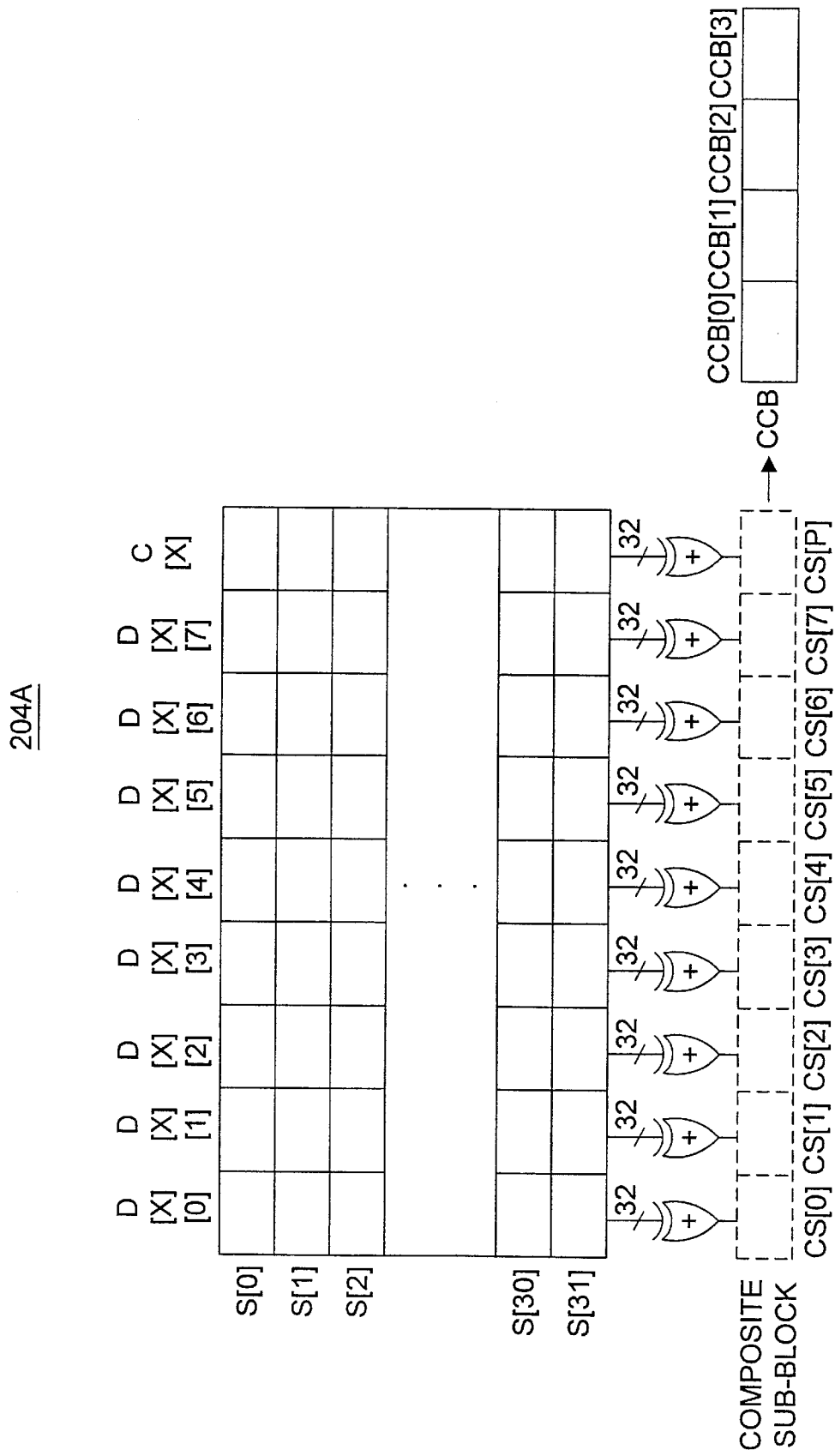
FIG. 5 illustrates an improved organization of a data block that includes error correction codes to correct single bit errors according to one embodiment of the present invention.

Turning now to FIG. 5, an improved organization of a data block that includes error correction codes to correct single bit errors according to one embodiment of the present invention is shown. In the illustrated embodiment, cache entry 204A includes 32 sub-blocks (S[0:31]) of eight data bits and one check bit each. The check bit block of FIG. 4 has been replaced with a composite check bit block (CCB). The composite check bit block (CCB) includes four composite check bits. Generally speaking, the composite check bits are an error code to locate an error within a composite sub-block. The composite sub-block is the column-wise exclusive-or of the sub-blocks. In other words, the first bit of the composite sub-block (CS [0]) is the exclusive-or of the first bit of each sub-block (D[x][0]). The second bit of the composite sub-block (CS[1]) is the exclusive-or of the second bit of each sub-block (D[x][1]), etc. Accordingly, in the illustrated embodiment, the composite sub-block includes nine bits. One bit of the composite sub-block corresponds to each data bit position within the sub-blocks and one bit corresponds to the check bit position within the sub-blocks.

If a bit error occurs, the bit in the composite sub-block corresponding to the bit position of the erroneous bit will change state. By locating the bit that changes state in the composite sub-block, the bit position of an erroneous bit within a sub-block may be located. Accordingly, the sub-block check bits may be used to locate which sub-block includes an erroneous data bit, and the composite check bits may be used to locate the bit position of the erroneous bit within that sub-block.

In one embodiment, the composite check bits are a single error correcting Hamming code for the nine bits for the composite sub-block. In the above-described manner, the number of check bits required to locate a bit error may be reduced. In the illustrated embodiment, the nine entry check bits of FIG. 4 are replaced by four composite check bits. It is noted that the composite sub-block is not stored in the cache. The composite sub-block is used as an intermediate step in calculating the composite check bits, which are stored in the cache entry.

As discussed above, in one embodiment, data are read in 32 byte blocks. Accordingly, when data are read from cache 202, an entry including 256 data bits and 36 check bits are provided to error detection circuit 206. Error correction unit 206 uses the sub-block check bit associated with each sub-block to determine whether a bit error occurs within that sub-block. If no errors are detected within the read sub-blocks, then the data are output without correction. If one of the sub-blocks contains an error, then the composite sub-block is regenerated, composite check bits are regenerated, and the regenerated composite check bits are compared to the stored composite check bits to locate the bit position of the error within the composite sub-block. The bit position of the error within the composite sub-block corresponds to the bit position of the erroneous bit in the sub-block that includes the erroneous bit. Alternatively, if an error is detected in two or more sub-blocks, then an uncorrectable error has occurred. The uncorrectable error may be reported to the system or the entry may be read again.

When a one byte write operation is performed, all stored sub-blocks of the entry are provided to error correction unit 206. Error correction unit 206 uses the sub-block check bits to detect bit errors within the entry. If a correctable error is detected, it is corrected using the composite check bits. If no uncorrectable errors are detected, then the byte and associated sub-block check bit are written to the entry and new composite check bits are generated. It is noted that the stored byte and check bit must be read prior to storing the new byte and check bit in order to detect and correct bit errors within the entry.

Table 1 below illustrates the bits of the composite sub-block (CS[0:7] and CS[P]) that contribute to each bit of the composite check bits (CCB[0:3]). Each row represents one of the four composite check bits. Each column represents one bit of the composite sub-block. Each bit of the composite sub-block that contributes to a composite check bit has a one in the corresponding box. For example, composite check bit three (CCB[3]) is the parity bit of CS[4:7] and CS[P]. It is noted that this is the equivalent of taking the exclusive-or of the bits in bit positions 4–7 and the check bits of all the sub-blocks.

TABLE 1

| CS[i]: | 0 | 1 | 2 | 3 | 4 | 5 | 6 | 7 | P |
|---|---|---|---|---|---|---|---|---|---|
| CCB[3] | 0 | 0 | 0 | 0 | 1 | 1 | 1 | 1 | 1 |
| CCB[2] | 0 | 1 | 1 | 1 | 0 | 0 | 0 | 1 | 1 |
| CCB[1] | 1 | 0 | 1 | 1 | 0 | 1 | 1 | 0 | 0 |
| CCB[0] | 1 | 1 | 0 | 1 | 1 | 0 | 1 | 0 | 1 |

In one embodiment, when the composite check bits are used to detect a bit position of an erroneous bit, syndrome bits (S[3:0]) are generated. Table 2 below illustrates which bits contribute to each syndrome bit. For example, S[3] is the exclusive-or of composite sub-block bits CS[4:7] and CS[P], and CCB [3]. The bit position of an error may be located by searching Table 2 to find the column which matches S[3:0]. The syndrome bits to which an erroneous bit contribute match the syndrome bits. If the syndrome bits do not match a column of Table 2, then more than one bit error has occurred.

TABLE 2

| CS[x]: | 0 | 1 | 2 | 3 | 4 | 5 | 6 | 7 | P | CCB0 | CCB1 | CCB2 | CCB3 |
|---|---|---|---|---|---|---|---|---|---|---|---|---|---|
| S[3] | 0 | 0 | 0 | 0 | 1 | 1 | 1 | 1 | 1 | 0 | 0 | 0 | 1 |
| S[2] | 0 | 1 | 1 | 1 | 0 | 0 | 0 | 1 | 1 | 0 | 0 | 1 | 0 |
| S[1] | 1 | 0 | 1 | 1 | 0 | 1 | 1 | 0 | 0 | 0 | 1 | 0 | 0 |
| S[0] | 1 | 1 | 0 | 1 | 1 | 0 | 1 | 0 | 1 | 1 | 0 | 0 | 0 |

Figure 6:
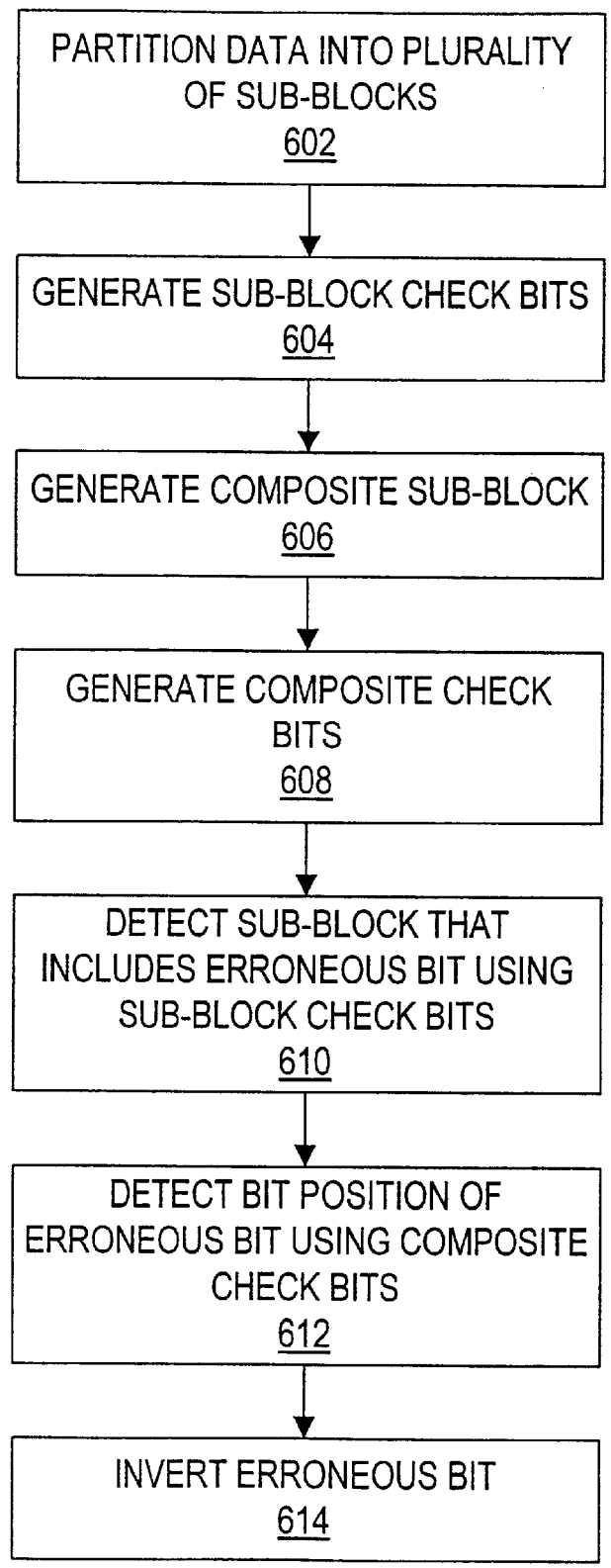
FIG. 6 is a flowchart diagram of a method for correcting single bit errors in caches with sub-block parity bits.

Turning now to FIG. 6, a method of correcting single bit errors in data blocks with sub-block check bits according to one embodiment of the present invention is shown. In step 602, the data block is partitioned into a plurality of sub-blocks. Each sub-block includes a plurality of bit positions. In step 604, a sub-block check bit for each sub-block is generated. The sub-block check bit may be used to detect an error within the sub-block. In one embodiment, the sub-block check bit is a parity bit for the data bits within the sub-block. In step 606, a composite sub-block is generated. A composite sub-block is the column-wise exclusive-or of the sub-blocks. It is noted that the composite sub-block is for computational purposes only and is not stored with the data block.

In step 608, composite check bits are generated for the composite sub-block. The composite check bits are an error code for the composite sub-block. The composite check bits may be used to detect and locate a bit position of an error within the composite sub-block. In one embodiment, the composite check bits are a single error correcting Hamming code for the composite sub-block. In step 610, the sub-block check bits are used to detect a bit error within a sub-block. In step 612, the composite check bits are used to detect the bit position of the error within the composite sub-block. The bit position of the error within the composite sub-block indicates the bit position of the error in the sub-block that contains the erroneous bit. In step 614 the erroneous bit is corrected by inverting the bit identified by the sub-block check bits and the composite check bits.

Figure 7:
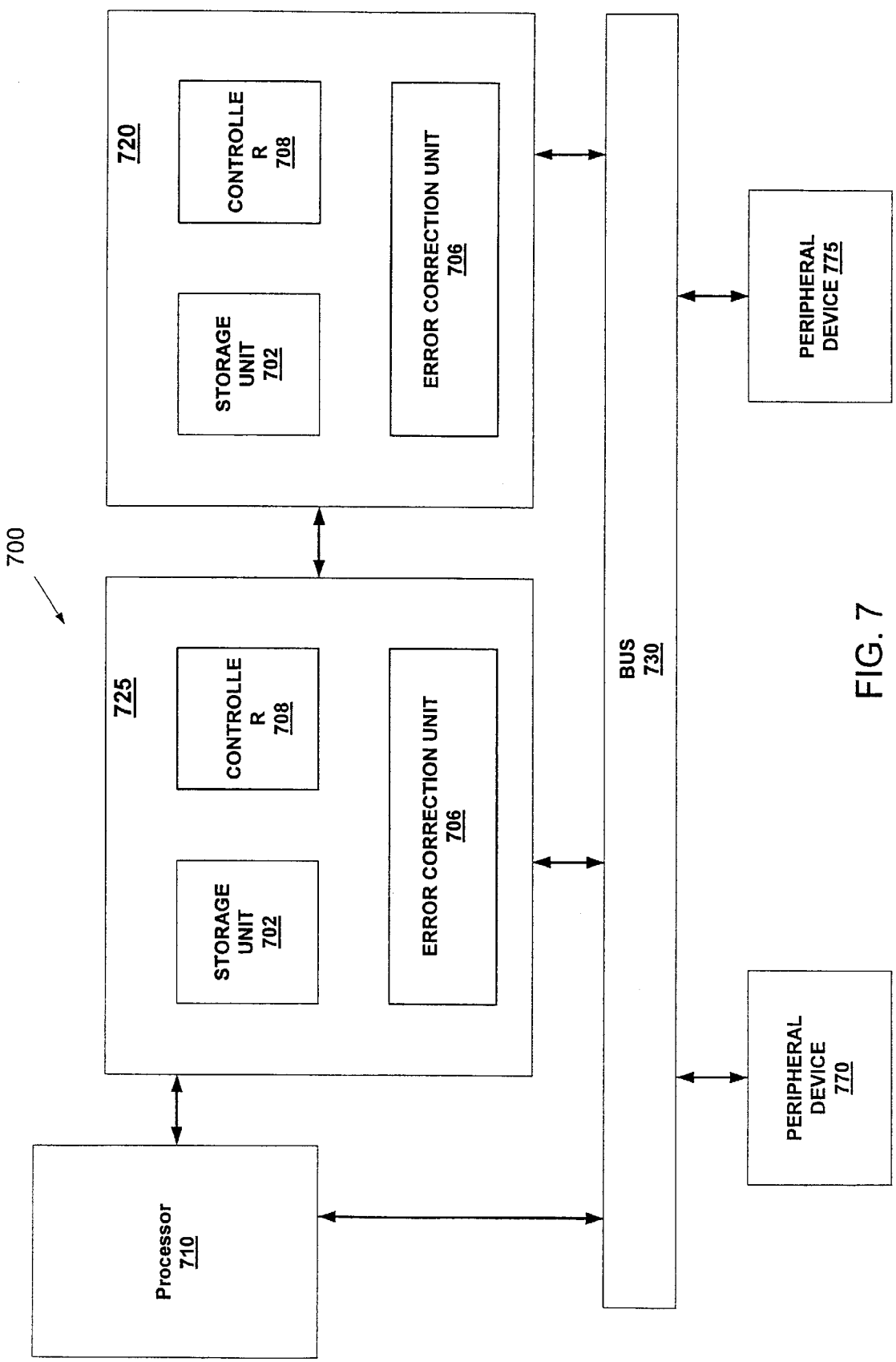
FIG. 7 is a block diagram of a computer system with a cache and system memory according to an embodiment of the present invention.

Turning now to FIG. 7, a block diagram of a computer system with a cache and system memory for correcting single bit errors with sub-block parity bits is shown. Computer system 700 includes a cache 725, a system memory 720, a bus 730 and peripheral devices 770 and 775. It should be noted that computer system 700 is only shown as an example and many other configurations are contemplated. System memory 720 and cache 725, both include storage unit 702, controller 708, and error correction unit 706 of the present invention; respectively. It should be also noted that cache unit 725 may be included within processor 710. Further, either the cache or the system memory may include the error detection unit 706 of the present invention. Bus 730 as shown is a system bus for simplicity, however, computer system 700 may include other buses. Instructions executed in processor 710 may control data movements among processor 710, cache 725, and system memory 720, and peripheral devices 770 and 775 through bus 730. Further, data movements may be also achieved directly between processor 710 and cache 725 and between cache 725 and system memory 720. Other algorithms, including cache coherency are contemplated. It should be noted that the number of buses, processors, caches, memories, and peripheral deices may vary within system 700. Error detection unit 706 may also be included within cache 725 and/or system memory 720 or outside these elements, such as in processor 710, bus 730, within a peripheral device, or the combination of such elements of the system.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A memory system configured to detect and correct a bit error in a data block, said memory system comprising:
   one or more storage devices configured to store said data block, wherein said data block comprises a plurality of sub-blocks, wherein each of said sub-blocks includes an equal number of a plurality of data bits and a check bit corresponding to said plurality of data bits; and
   an error correction circuit coupled to said one or more storage devices, wherein said error correction circuit is configured to:
   receive each of said sub-blocks of said data block,
   generate said check bits corresponding to each of said sub-blocks,
   generate a composite sub-block corresponding to said data block, and
   generate composite check bits corresponding to said composite sub-block, wherein said composite check bits include a number of bits less than a number of bits in said composite sub-block;
   wherein said sub-block check bits and said composite check bits are stored in said one or more storage devices of said memory system, and
   wherein, when a data block with an erroneous bit is read from said one or more storage devices, said error correction circuit uses said sub-block check bits to determine a sub-block that includes said erroneous bit and said composite check bits to determine a bit position of said erroneous bit within said sub-block that includes said erroneous bit.

2. The memory system as recited in claim 1 wherein said sub-block check bits are parity bits.

3. The memory system as recited in claim 2 wherein each bit of said composite sub-block is the column-wise exclusive-or of corresponding bits within said plurality of sub-blocks.

4. The memory system as recited in claim 3 wherein said composite check bits implement a single error correcting Hamming code for said composite sub-block.

5. The memory system as recited in claim 2, wherein each of said sub-blocks includes a plurality of bit positions, and wherein each bit position of said composite sub-block corresponds to one of said bit positions of said plurality of sub-blocks.

6. The memory system of claim 2, wherein said check bit corresponding to said plurality of data bits is derived solely from said plurality of data bits of the sub-block corresponding to said check bit.

7. A cache configured to detect and correct a bit error in a data block stored in said cache, said cache comprising:
   a storage device configured to store said data block, wherein said data block comprises a plurality of sub-blocks, wherein each of said sub-blocks includes an equal number of a plurality of data bits and a check bit corresponding to said plurality of data bits; and
   an error correction circuit coupled to said storage device, wherein said error correction circuit is configured to:
   receive each of said sub-blocks of said data block,
   generate said check bits corresponding to each of said sub-blocks,
   generate a composite sub-block corresponding to said data block, and
   generate composite check bits corresponding to said composite sub-block, wherein said composite check bits include a number of bits less than a number of bits in said composite sub-block;
   wherein said sub-block check bits and said composite check bits are stored in said storage device of said memory system, and
   wherein, when a data block with an erroneous bit is read from said storage device, said error correction circuit uses said sub-block check bits to determine a sub-block that includes said erroneous bit and said composite check bits to determine a bit position of said erroneous bit within said sub-block that includes said erroneous bit.

8. The cache as recited in claim 7 wherein said sub-block check bits are parity bits.

9. The cache as recited in claim 8 wherein each bit of said composite sub-block is the column-wise exclusive-or of corresponding bits within said plurality of sub-blocks.

10. The cache as recited in claim 9 wherein said composite check bits implement a single error correcting Hamming code for said composite sub-block.

11. The cache as recited in claim 8 wherein each of said sub-blocks includes a plurality of bit positions, and wherein each bit position of said composite sub-block corresponds to one of said bit positions of said plurality of sub-blocks.

12. The cache of claim 8, wherein said check bit corresponding to said plurality of data bits is derived solely from said plurality of data bits of the sub-block corresponding to said check bit.

13. A computer system comprising:

a processor;

a bus;

a memory coupled to said processor and said bus, comprising:
one or more storage devices configured to store a data block, wherein said data block comprises a plurality of sub-blocks, wherein each of said sub-blocks includes an equal number of a plurality of data bits and a check bit corresponding to said plurality of data bits; and
an error correction circuit coupled to said one or more storage devices, wherein said error correction circuit is configured to:
receive each of said sub-blocks of said data block,
generate said check bits corresponding to each of said sub-blocks,
generate a composite sub-block corresponding to said data block, and
generate composite check bits corresponding to said composite sub-block, wherein said composite check bits include a number of bits less than a number of bits in said composite sub-block;
wherein said sub-block check bits and said composite check bits are stored in said one or more storage devices of said memory system, and
wherein, when a data block with an erroneous bit is read from said one or more storage devices, said error correction circuit uses said sub-block check bits to determine a sub-block that includes said erroneous bit and said composite check bits to determine a bit position of said erroneous bit within said sub-block that includes said erroneous bit.

14. The computer system as recited in claim 13 wherein said sub-block check bits are parity bits.

15. The computer system as recited in claim 14 wherein each bit of said composite sub-block is the column-wise exclusive-or of corresponding bits within said plurality of sub-blocks.

16. The computer system as recited in claim 15 wherein each of said sub-blocks includes a plurality of bit positions, and wherein each bit position of said composite sub-block corresponds to one of said bit positions of said plurality of sub-blocks.

17. The computer system as recited in claim 16 wherein said composite check bits implement a single error correcting Hamming code for said composite sub-block.

18. The computer system of claim 14, wherein said check bit corresponding to said plurality of data bits is derived solely from said plurality of data bits of the sub-block corresponding to said check bit.

19. A method of correcting a bit error in a data block, said method comprising:
partitioning said data block into a plurality of sub-blocks, wherein each sub-block includes a an equal number of a plurality of bit positions;
generating a first sub-block check bit for a first plurality of bits of said data block, wherein said first plurality of bits is assigned to a first sub-block, said first sub-block check bit is used to detect an error within said first plurality of bits within said first sub-block;
generating a composite sub-block, wherein each bit within said composite sub-block corresponds to a bit position in said plurality of sub-blocks;
generating composite check bits for said composite sub-block, wherein said composite check bits include a number of bits less than a number of bits in said composite sub-block;
detecting an erroneous bit in said first sub-block using said first sub-block check bit and determining a bit position of said erroneous bit using said composite check bits; and
inverting said erroneous bit.

20. The method as recited in claim 19 wherein said first sub-block check bit is a parity bit.

21. The method as recited in claim 20 wherein each bit of said composite sub-block is the column-wise exclusive-or of corresponding bits within said plurality of sub-blocks.

22. The method as recited in claim 21 wherein each of said sub-blocks includes a plurality of bit positions, and wherein each bit position of said composite sub-block corresponds to one of said bit positions of said sub-blocks.

23. The method as recited in claim 21 wherein said composite check bits implement a single error correcting Hamming code for said composite sub-block.

24. The method as recited in claim 23 wherein a sub-block check bit is generated for a plurality of bits portioned from said data block within each sub-block of said sub-blocks.

25. The method as recited in claim 24 wherein said sub-block check bits and said composite check bits are stored in a storage device with said plurality of bits of said data block.

26. The method as recited in claim 25 wherein said sub-block check bits are regenerated when said plurality of bits of said data block is read from said storage device.

27. The method as recited in claim 26 wherein a sub-block that includes an erroneous bit is detected by comparing regenerated said sub-block check bits to said sub-block check bits stored with said plurality of bits of said data block.

28. The method as recited in claim 27 wherein syndrome bits for said composite sub-block are generated when said plurality of bits of said data block is read from said storage device, wherein said syndrome bits identify a bit position of said erroneous bit.

29. The method of claim 20, wherein said check bit corresponding to said first plurality of bits is derived solely from said first plurality of bits.

30. An apparatus for correcting a bit error in a data block, said apparatus comprising:
means for partitioning said data block into a plurality of sub-blocks, wherein each sub-block includes an equal number of a plurality of bit positions;
means for generating a first sub-block check bit for a first plurality of bits of said data block, wherein said first plurality of bits is assigned to a first sub-block, said first sub-block check bit is used to detect an error within said first plurality of bits within said first sub-block;
means for generating a composite sub-block, wherein each bit within said composite sub-block corresponds to a bit position in said plurality of sub-blocks;
means for generating said composite check bits for said composite sub-block, wherein said composite check bits include a number of bits less than a number of bits in said composite sub-block;

means for detecting an erroneous bit in said first sub-block using said first sub-block check bit and determining a bit position of said erroneous bit using said composite check bits; and means for inverting said erroneous bit.

31. The apparatus as recited in claim 30 wherein said first sub-block check bit is a parity bit.

32. The apparatus as recited in claim 31 wherein each bit of said composite sub-block is the column-wise exclusive-or of corresponding bits within.

33. The apparatus as recited in claim 32 wherein each of said sub-blocks includes a plurality of bit positions, and wherein each bit position of said composite sub-block corresponds to one of said bit positions of said sub-blocks.

34. The apparatus as recited in claim 32 wherein said composite check bits implement a single error correcting Hamming code for said composite sub-block.

35. The apparatus as recited in claim 34 wherein a sub-block check bit is generated for a plurality of bits portioned from said data block within each sub-block of said sub-blocks.

36. The apparatus as recited in claim 35 wherein said sub-block check bits and said composite check bits are stored in a storage device with said plurality of bits of said data block.

37. The apparatus as recited in claim 36 wherein said sub-block check bits are regenerated when said plurality of bits of said data block is read from said storage device.

38. The apparatus as recited in claim 37 wherein a sub-block that includes an erroneous bit is detected by comparing regenerated said sub-block check bits to said sub-block check bits stored with said plurality of bits of said data block.

39. The apparatus as recited in claim 38 wherein syndrome bits for said composite sub-block are generated when said plurality of bits of said data block is read from said storage device, wherein said syndrome bits identify a bit position of said erroneous bit.

40. The apparatus of claim 31, wherein said check bit corresponding to said first plurality of bits is derived solely from said first plurality of bits.

* * * * *